Nov. 13, 1945.   J. JANDASEK   2,388,849
TRANSMISSION
Filed Feb. 17, 1940   2 Sheets-Sheet 1

INVENTOR
Joseph Jandasek.
BY Dike, Calver & Gray
ATTORNEYS.

Nov. 13, 1945.  J. JANDASEK  2,388,849
TRANSMISSION
Filed Feb. 17, 1940  2 Sheets-Sheet 2
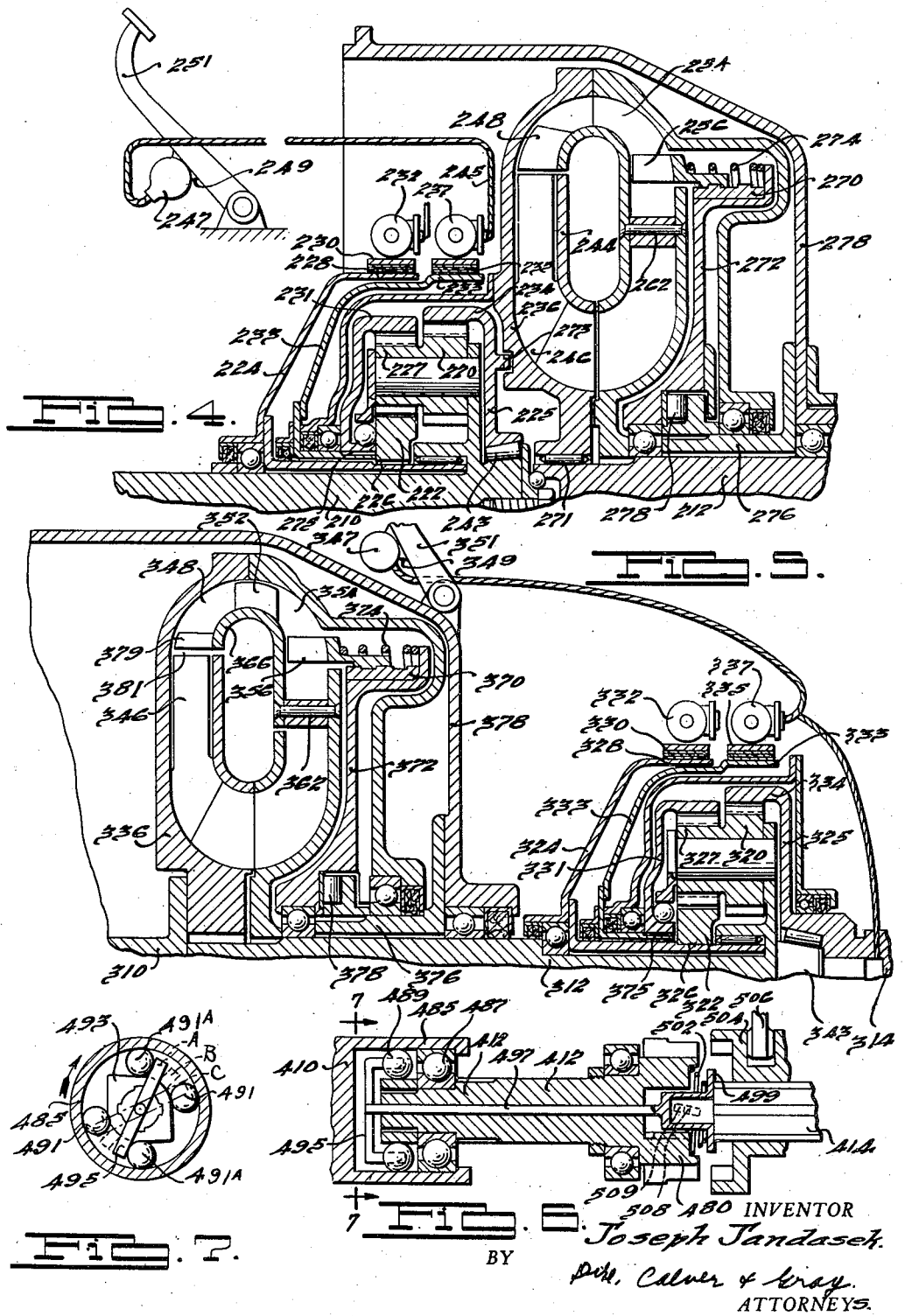

Patented Nov. 13, 1945

2,388,849

UNITED STATES PATENT OFFICE 2,388,849

TRANSMISSION

Joseph Jandasek, Detroit, Mich., assignor to Bendix Aviation Corporation, South Bend, Ind., a corporation of Delaware Application February 17, 1940, Serial No. 319,442

2 Claims. (Cl. 60—54)

This invention relates to transmissions and more particularly to transmissions of the fluid torque converter type wherein means are provided to increase the efficiency of the transmission by operating impeller or turbine elements at their most efficient speeds.

An object of this invention is to provide an improved transmission of the fluid torque converter type having means to vary the speed of rotation of the impeller or driven shaft units whereupon the efficiency of the transmission may be considerably increased.

Another object of the invention is to provide speed increasing means between a driving shaft and an impeller of a fluid torque converter whereby the driving speed of the impeller may be controlled automatically or manually to produce desirable torque multiplication at varying speeds.

Yet a further object of the invention is to provide novel means to drive an impeller of a fluid torque converter at variable speeds and to reverse the direction of rotation thereof by means of novel planetary driving means interposed between the impeller and a driving shaft.

A further object of the invention resides in the provision of means influenced by the speed of rotation of a transmission driven shaft to vary the driving speed of the impeller of a fluid torque converter.

Yet a still further object of the invention is to provide improved control means for varying the speed of rotation of an impeller of a fluid torque converter and to reverse the direction of rotation thereof.

A still further object is to provide automatically operable means to vary the speed of rotation of an impeller element in accordance with the speed of rotation of a driven element.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Figure 4 is a view similar to Figure 1 showing a still further modified form of the invention;

Figure 5 is a sectional view of a transmission unit wherein means are interposed between a fluid torque converter and a driven shaft to vary the direction and speed of rotation thereof;

Figure 6 is a sectional view similar to Figure 3, and

Figure 7 is a sectional view taken substantially on the line 7—7 of Figure 6.

Figures 1, 2, 3:
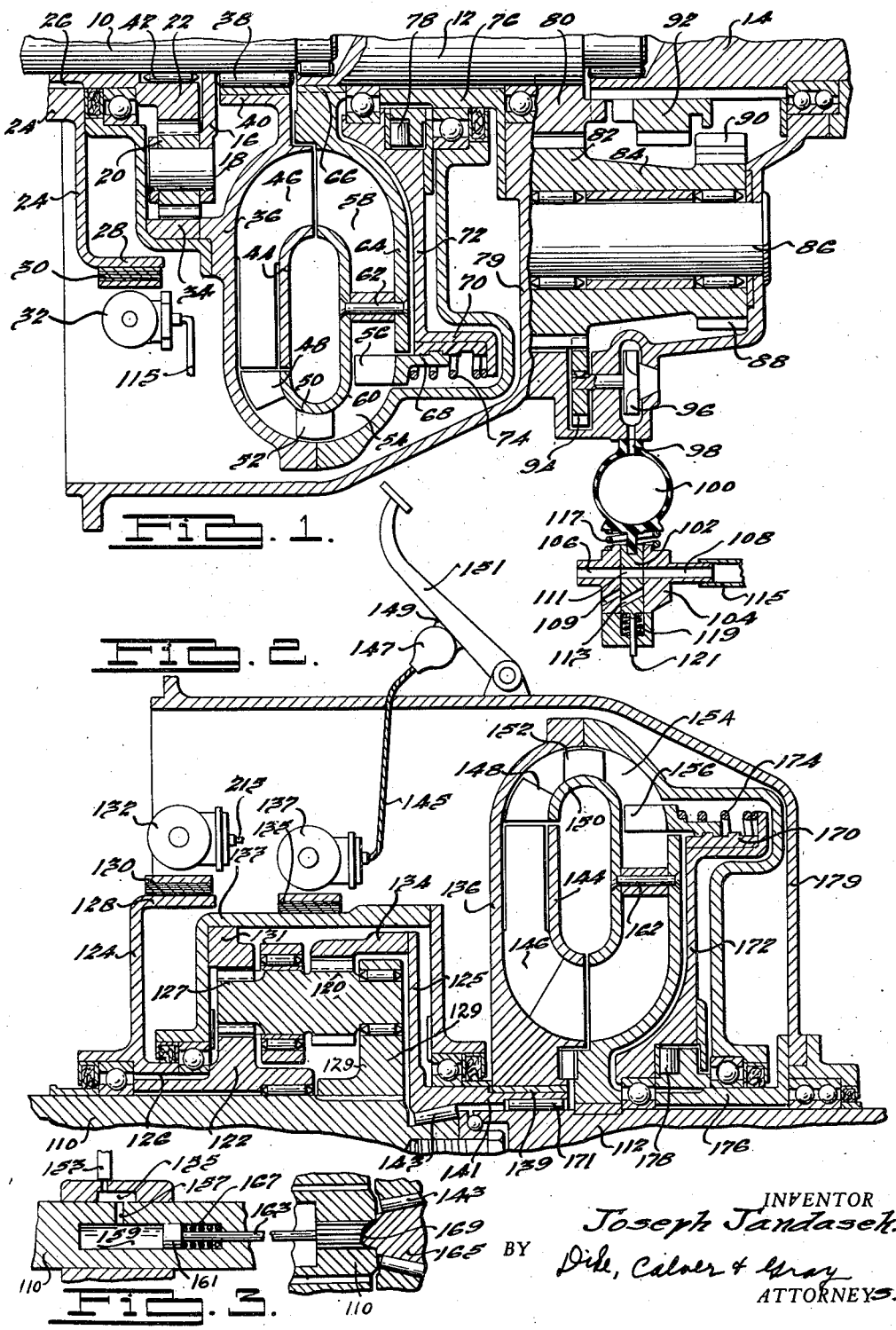
Figure 1 is a sectional view of a transmission embodying the present invention.
Figure 2 is a sectional view showing a modified form of the invention.
Figure 3 is a sectional view illustrating a modified form of driving means interposed between a driving shaft and an impeller.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Figure 1, it will be observed that a driving shaft 10 is suitably journaled as in the end of a driven shaft 12. A final driven shaft 14 may be positioned to be driven in either direction from the driven shaft 12.

The driving shaft 10 has a radially extended flange 16 supporting a plurality of spaced stub shafts 18. The shafts 18 support pinions 20 in mesh with a sun gear 22 suitably journaled on the driving shaft 10. The sun gear 22 is fixed to a hub 24 by means of splines 26. The hub 24 supports a drum 28 adapted to be engaged by friction means 30 operated by any suitable means such for example as a hydraulic unit 32.

The pinions 20 mesh with a ring gear 34 carried by an impeller web 36. If desired, the impeller web 36 may also be driven by a one-way driving means 38 interposed between the driving shaft 10 and an impeller hub 40.

When it is desired to drive the impeller of the torque converter at a speed different than that of the driving shaft 10, the hydraulic unit 32 may be actuated to lock the drum 28 against rotation thereby stopping the sun gear 22 from rotation. When the sun gear 22 is stationary the pinions 20 revolve about it to drive the ring gear 34 in the impeller web at a speed higher than that of the driving shaft 10. If it is desired to drive the impeller at a speed slower than that of the driving shaft, the planetary gearing can of course be varied to produce the desired ratio.

When the hydraulic unit 32 is actuated to release the drum 28, the sun gear 22 is free to revolve about the driving shaft 10 on suitable bearings 42, and the planetary gearing is thereby rendered inoperative. When the sun gear 22 rotates freely about the driving shaft 10, the impeller web 36 is driven by means of a one-way clutch 38 interposed between the driving shaft 10 and the impeller hub 40.

The impeller web 36 carries an impeller shroud 44 having a suitable fluid circulating channel 46 interposed therebetween. The impeller fluid circulating channel 46 of the impeller communicates with a vortex chamber interposed between the vanes 48 and 52 which serves to decrease the fluid velocity thereby increasing its pressure whereupon shock losses are minimized at the entrance to a turbine channel 50.

Fluid flowing through the turbine 50 imparts energy to the vanes 52 of the turbine or runner element, and after leaving the turbine the fluid passes through a vortex chamber 54 wherein the velocity of the fluid is increased and the pressure correspondingly decreased which results in greater torque multiplication in the turbine. After passing through the vortex chamber 54 the fluid passes through a guide wheel 56 having suitable vanes, and is thereafter directed to a vortex chamber 58 which communicates with the entrance to the impeller fluid channel 46.

The turbine vanes 52 are carried by a turbine shroud 60 connected to a turbine web 64 by means such for example as rivets 62 having suitable streamlining fairings. The turbine web 64 is suitably fixed to the driven shaft 12 in any desired manner such for example as by splines 66. A guide wheels 56 is provided with a cylindrical actuating member 68 having a helix formed in its inner surface which cooperates with an external helix formed in a flange 70 carried by a guide wheel web 72 to permit the guide wheel 56 to be moved into and out of the fluid circuit. The direction of the helix is selected so that at heavy loads the vanes 56 are in the fluid circuit to operate the unit as a torque converter. At light loads and higher speeds the vanes 56 are withdrawn from the fluid circuit by the fluid reaction and the unit operates as a turbo clutch. If desired suitable resilient means such for example as a spring 74 may be provided to resiliently urge the guide wheel 56 into the fluid circuit in opposition to the force of the circulating fluid urging it outwardly.

The guide wheel web 56 is suitably connected to a stationary sleeve 76 by means of one-way brake means 78. The one-way brake means 78 serves to permit free rotation of the guide wheel in one direction and to hold it against rotation in the opposite direction. The sleeve 76 is fixed to a stationary housing 79 which may if desired surround the unit.

A gear 80 fixed to the driven shaft 12 meshes with a gear 82 carried by a spool gear 84 on a countershaft 86. The spool gear 84 is provided with a gear 88 spaced from the gear 82 and meshing with an idler gear 90 to effect a reverse drive of the final driven shaft 14.

Means such for example as an axially shiftable gear 92 suitably mounted on the final driven shaft 14 by means of splines may be provided to interconnect the gear 80 fixed to the driven shaft 12 with the final driven shaft 14 to drive the shaft 14 in the forward direction. The gear 92 may be shifted axially on the shaft 14 to engage the idler gear 90 whereupon the final driven shaft 14 will be driven through the gears 80, 82, 88, 90 and 92 in the reverse direction to that of the intermediate shaft 12. Suitable synchronizing means such for example as that disclosed in my co-pending application Serial No. 317,637 filed February 7, 1940, now Patent No. 2,333,253, dated November 2, 1943, may be provided to synchronize the speed of rotation of these gears.

A gear 94 driven by the gear 82 may be provided to drive a pump 96 having a discharge opening 98 communicating with a resilient chamber 100. The chamber 100 carries a slide valve member 102 suitably mounted in a housing 104 having an entrance opening 106; a discharge opening 108, and a relief opening 109. The valve member 102 is provided with spaced openings 111 and 113 which selectively interconnect the discharge opening 108 with the entrance opening 106 or the discharge opening 109 respectively. The discharge opening 108 communicates by way of a conduit 115 with the hydraulic unit 32.

When the speed of rotation of the intermediate driven shaft 12 approaches a substantially predetermined value, the gear 94 driven by the gear 82 operably connected to the shaft 12 through the gear 80 rotates the pump 96 at a sufficient speed to build up a predetermined pressure within the resilient chamber 100 whereupon the valve member 102 moves downwardly against the resistance of springs 117 and 119 to interconnect the openings 106 and 108 by means of the spaced opening 111 as illustrated to actuate the hydraulic unit 32 to apply the brake 30 and to hold the sun gear 22 from rotation whereupon power will be transmitted from the driving shaft 10 through the flange 16 and the associated planetary gearing to drive the ring gear 34 fixed to the impeller web 36 at a speed different from that of the driving shaft 10.

Means are provided to subject the valve member 102 to a force which varies in proportion to throttle position. One desirabel form of such means is exemplified by a rod 121 operably connected to the engine throttle linkage in such a manner as to oppose the force exerted by the pump 96 as the throttle approaches the open position.

When the speed of the intermediate shaft 12 decreases to such a point that the pressure developed by the pump 96 is insufficient to maintain the valve member 102 in the position illustrated, the springs 117 and 119 yieldingly urge the valve member 102 upwardly whereupon the discharge opening 108 is interconnected with the opening 109 through the spaced opening 113 and the hydraulic unit 32 is released. The impeller web 36 is then driven from the driving shaft 10 through the one-way driving means 38 at substantially the same speed as the speed of rotation of the driving shaft 10.

The embodiment illustrated in Figure 2 is similar in many respects to that illustrated in Figure 1 and corresponding parts have therefore been given corresponding reference numerals with the addition of 100.

A ring gear 134 is operably connected through a flange 125 to the impeller web 136. Pinions 120 are formed integral with other pinions 127 of different diameter. The pinions 120 and 127 are driven through a flange 129 suitably fixed to the driving shaft 110. The flange 129 supports the pinions 120 and 127 as illustrated.

A reverse ring gear 131 fixed within a rotatable housing 133 meshes with the pinions 127. When the cylinder 133 is held against rotation by suitable friction means 135, controlled by suitable actuating means such for example as the hydraulic unit 137 the ring gear 134, in the reverse direction is driven. Due to the variation in diameter of the pinions 120 and 127, rotation of the ring gear 134 operates through the flange 125 to drive the impeller web 136 in reverse direction.

When the device is thus operated to drive the impeller in reverse, a helical spline 139 interposed between the impeller web 136 and a sleeve 141 carried by the web 125 operates to move the sleeve 141 and the web 125 axially to release the one-way driving means 143 interposed between a driving shaft 110 and the sleeve 141.

Manually operable means are provided to actuate the hydraulic unit 137 to drive the impeller unit 136 in reverse. One desirable form of actuating means comprises a suitable fluid conduit 145 connecting the hydraulic unit 137 to a compression chamber 147. The chamber 147 may be protected as by means of a guard member 149 and is adapted to be actuated by a manually operable lever 151. Upon actuation of the manually operable lever 151 fluid pressure is transmitted from the chamber 147 through the conduit 145 to actuate the hydraulic unit 137 whereupon the friction means 135 engages the surface of the cylinder 133 to lock the reverse ring gear 131 to transmit power from the driving shaft 110 to the impeller web 136 in reverse. It will be observed that when it is desired to actuate the reversing mechanism the speed of the driven shaft will be insufficient to produce pressure required to actuate the hydraulic unit 132 and that power will be transmitted through the pinion 120, ring gear 134, flange 125, sleeve 141 to the driven shaft 112 through the one-way driving means 171. The variable speed drive is thus rendered inoperative when the reverse drive mechanism is actuated.

Referring now to Figure 3, it will be observed that means are provided to simultaneously disengage the one-way driving means 143 upon actuation of the manually operable lever 151 to effect reverse drive. This means comprises a conduit 153 communicating with the conduit 145 and terminating in a chamber 155 communicating by way of an orifice 157 with the chamber 159. A piston 161 slidably mounted in the cylinder 159 is operably connected to a rod 163 to move a cone 165 axially relative to the shaft 110 to release the one-way clutch means 143. It will be noted that spring means 167 interposed between the end of the cylinder 159 and the piston 161 are provided to actuate the rod 163 to return the cone 165 into engagement with the one-way driving means 143 when the manually operable reverse means is released. It will be noted that the cone 165 is operably connected to the driving shaft 110 by means of splines 169.

Referring now to Figure 4, it will be observed that this embodiment is similar in many respects to that of Figure 2. Corresponding parts have therefore been given corresponding reference numerals with the addition of 100.

It will be observed that in this embodiment of the invention the flange 224 which carries the axially extending portion 228 is rotatably mounted on the driving shaft 210 and is splined to the overdrive sun gear 222 which meshes with the pinion 227 to transmit power through the pinion 220 to the ring gear 234 and flange 225. The flange 225 is operably connected to drive the impeller 236 by means of key or gear driving means 273.

To effect reverse drive the hydraulic unit 237 is actuated whereupon the friction means 235 engages the flange 233. The flange 233 is operably connected through a spline 275 to a ring gear 231. When the hydraulic unit is actuated to lock the flange 233 the ring gear 231 is also locked whereupon the pinions 227 rotate within the ring gear 231 and due to the variation in diameter between the pinions 227 and 220 which are fixed together, the ring gear 234 is rotated in the reverse direction and drives the driving means 273 to rotate the impeller web 236 in reverse direction. Rotation of the impeller web 236 in reverse direction operates through the one-way driving means 271 to rotate the driven shaft 212 in reverse direction. The gears on the pinions 220 and ring gear 234 are preferably helical gears whereupon the ring gear 234 and the flange 225 will be moved axially toward the left as illustrated in Figure 4 a short distance to release the one-way driving means 243 interposed between the flange 225 and the driving shaft 210.

Referring now to Fig. 5, it will be observed that reverse and overdrive means are associated with the driven shaft 312 to actuate a final drive shaft 314 at speeds different than the speeds of the driven shaft 312. In view of the fact that this speed varying means is similar in many respects to that illustrated in connection with Figure 4, corresponding parts have been given corresponding reference numerals with the addition of 100, the impeller and turbine members being directly connected to the driving and driven shafts 310 and 312, respectively.

Attention is called to the fact that rectifying vanes 379 are carried by the turbine shroud 366 adjacent the discharge end of the impeller blade 346 driven by the driving shaft 310 whereupon a relatively short vortex chamber 361 lies between the discharge end of the impeller blade 346 and the entrance to the rectifying vanes 379 carried by the driven shaft 312. It will be observed that the main turbine vanes 352 are positioned substantially at the point of largest diameter of the unit and that the vortex chamber 348 is interposed between the discharge of the rectifying vanes 379 and the entrance to the main vanes 352 to minimize shock losses and turbulence as the fluid flows from the impeller to the turbine elements.

To drive the final drive shaft 314 at higher speed than the driven shaft 312, the hydraulic unit 332 is actuated to engage the friction means 330 with the flange 328 whereupon the flange 324 is locked against rotation and by means of the splines 326 the sun gear 322 is held stationary whereupon the pinions 327 rotate about the sun gear 322 and drive the pinions 320 which mesh with and drive the ring gear 334 operably connected through the flange 325 to the final driven shaft 314. When the final driven shaft 314 is being driven at a different speed such for example as at overdrive speed, the one-way driving means 343 is automatically released as discussed above.

To drive the final driven shaft 314 in reverse direction, the hydraulic unit 337 may be actuated whereupon the friction means 335 engages the cylinder 333 to hold the ring gear 331 against rotation by means of the splines 375. The pinions 327 then rotate within the ring gear 331 and through the pinions 320 which are of different diameter than the pinions 327 to drive the ring gear 334 in reverse direction. When the device is operating in this manner the flange 325 drives the final driven shaft 314 and the one-way clutch 343 is automatically disengaged as discussed in connection with Figure 3. If desired the release may be accomplished by the mechanism illustrated in Figures 6 and 7, or by means of the helical gears discussed in connection with the embodiment of Figure 4.

Referring now to Figures 6 and 7, it will be observed that a driving shaft 410 is provided with a driving sleeve 485 which supports a bearing 487 between it and the driven shaft 412. One-way driving means 489 such for example as sets of balls 491 and 491A interposed between a cam 493 and the sleeve 485 and actuated by an arm 495 are provided to transmit power to or from the driven shaft 412 under certain conditions of operation. The arm 495 may be actuated by means of a rod 497 extending through the driven shaft 412 and terminating in a flange 499 having a spring 502 interposed between it and the end of the driven shaft 412.

The flange 499 may be actuated by means of an axially shiftable sleeve 504 carried by the final driven shaft 414 and actuated by means of a fork 506. Upon axial movement of the flange 499, the rod 497 is rotated slightly by means of a projection 508 slidably mounted in a helical groove 509 formed in the gear 480 to release the drive. When the fork 506 is actuated to shift the sleeve 504 into engagement with the flange 499 the rod 497 is rotated slightly through the projection 508 and groove 509 to rotate the arm 495 angularly a short distance to engage either pair of balls 491 or 491A with the cam surfaces of the cam member 493 and the sleeve 485 to effect a drive through the wedging action of the members.

Referring to Fig. 7, it will be observed that when the arm 495 is in the position A illustrated in solid lines, the balls 491A are moved into engagement with the cam surfaces of the cam member 493 and the sleeve 485 to effect a drive between the driving and driven members 410 and 412 respectively when the driven shaft 412 tends to overrun the driving shaft 410. When the arm 495 is moved to the intermediate position B illustrated in dotted lines, the balls 491 and 491A are inoperative, whereupon the turbo unit becomes operative in the normal manner. The position of the arm 495 is of course controlled by the rod 497 in the manner more clearly illustrated in Fig. 6. In order to effect a drive between the cam member 493 and the sleeve 485, it is necessary that the balls be forcibly urged into wedging action therebetween. When the arm 495 is moved to the position illustrated at C in Fig. 7, the balls 491 will be forced into wedging engagement between the cam member 493 and the sleeve 485 to effect a driving connection between the driving and driven shafts 410 and 412 respectively. The driving and driven shafts will thereon be locked together and the turbo unit will be rendered inoperative.

It will be understood that the control mechanism for actuating the variable speed drive such for example as the overdrive illustrated in Figure 1, may be employed with all of the embodiments illustrated to automatically render the variable speed drive inoperative under certain conditions of operation. It will also be apparent that any of the features illustrated in one of the figures hereof may be replaced by corresponding elements illustrated in other figures wtihout departing from the spirit of this invention.

It will be apparent that in all of the units illustrated, the guide elements may be eliminated whereupon the hydraulic units operate as turbo clutches rather than as torque converters.

This is a continuation-in-part of my co-pending application Serial No. 7,896, now Patent No. 2,205,794, issued June 25, 1940.

I claim:

1. In a transmission having driving and driven shafts, a torque converter comprising impeller and turbine elements associated with the shafts, driving means between the driving shaft and impeller comprising a plurality of planetary gear trains selectively operable to drive the impeller at a speed different than that of the driving shaft or in reverse, one-way driving means between the driving shaft and impeller to drive the impeller at substantially the same speed as the driving shaft, means to release the one-way driving means, fluid pressure operated means controlled by the speed of the driven shaft to render one of said planetary gear trains inoperative, and manually operable means to render another of said planetary gear trains operative to drive the impeller in reverse.

2. In a transmission having driving and driven shafts, a torque converter having impeller and turbine elements associated with the driving and driven shafts, driving means comprising a plurality of sets of planetary gear trains interposed between the driving shaft and impeller, one-way driving means between the driving shaft and impeller, means controlled by the speed of rotation of the driven shaft to render one of said planetary gear trains operative to drive the impeller at a higher speed than the driving shaft when the driven shaft is rotating at a substantially predetermined speed and to render said planetary gear train inoperative so as to drive the impeller through the one-way driving means at substantially the same speed as the driving shaft when the driven shaft is rotating below said predetermined speed, and manually operable means to render one of said planetary gear trains operative to drive the impeller in reverse direction relative to the driving shaft and to make said one-way driving means inoperative.

JOSEPH JANDASEK.